#55/3

United States Patent [19]

Lieberman et al.

[11] 3,717,813

[45] Feb. 20, 1973

[54] AMPLIFIER STATION

[75] Inventors: Daniel Lieberman; Ralph E. Neuber, both of Seneca Falls, N.Y.

[73] Assignee: GTE Sylvania Incorporated, Seneca Falls, N.Y.

[22] Filed: April 1, 1971

[21] Appl. No.: 130,088

[52] U.S. Cl. ........................................325/3, 317/100

[51] Int. Cl. ................................................H04b 1/60

[58] Field of Search ..325/3, 308, 352; 317/101, 118; 178/DIG. 13; 339/121

[56] References Cited

UNITED STATES PATENTS

| | | | |
|---|---|---|---|
| 3,328,645 | 6/1967 | Becker | 317/100 |
| 3,359,460 | 12/1967 | Ragone | 317/99 |
| 3,610,810 | 10/1971 | Fribley | 317/118 X |

OTHER PUBLICATIONS

Sylvania Wide Spectrum Cable Communications Equipment, June 3, 1969, pp. 1–9

*Primary Examiner*—Robert L. Griffin
*Assistant Examiner*—Barry L. Leibowitz
*Attorney*—Norman J. O'Malley, Robert E. Walrath and Thomas H. Buffton

[57] ABSTRACT

An amplifier station for community antenna television (CATV) signal distribution systems is shown. The amplifier station includes an enclosed housing with ports for connection to trunk and distribution cables. A chassis is disposed within the housing and includes a base plate carrying a number of radio frequency terminals. Modules carrying mating connectors are plugged into the radio frequency terminals.

8 Claims, 8 Drawing Figures

INVENTORS
DANIEL LIEBERMAN &
RALPH E. NEUBER

BY

Robert E. Walrath

ATTORNEY

INVENTORS
DANIEL LIEBERMAN &
RALPH E. NEUBER

BY Robert E. Walrath

ATTORNEY

INVENTORS
DANIEL LIEBERMAN &
RALPH E. NEUBER
BY
Robert E. Walrath
ATTORNEY

INVENTORS
DANIEL LIEBERMAN &
RALPH E. NEUBER
BY Robert E. Walrath
ATTORNEY

INVENTORS
DANIEL LIEBERMAN &
RALPH E. NEUBER
BY
Robert E. Walrath
ATTORNEY

AMPLIFIER STATION

CROSS-REFERENCE TO RELATED APPLICATIONS

William P. Mueller, "Diplex Filter," Ser. No. 29,896 filed Apr. 20, 1970, now abandoned; Daniel Lieberman, "Monitoring Circuit and System," Ser. No. 75,429, filed Sept. 26, 1970; Ralph E. Neuber, "Clamp with Surge Protection," Ser. No. 98,686, filed Dec. 16, 1970, now U.S. Pat. No. 3,659,153; Ralph E. Neuber, "Terminal Assembly," Ser. No. 112,863 filed Feb. 5, 1971, all assigned to the same assignee as the present invention.

BACKGROUND OF THE INVENTION

This invention relates to an amplifier station for amplifying and/or distributing radio frequency (RF) signals particularly suited for CATV systems.

In CATV and similar RF signal transmission or distribution systems amplifier stations are distributed along a coaxial cable to maintain the RF signal levels. Such systems typically include a trunk line running from a head-end or other centralized location which provides the RF signals. Distribution lines are tapped-off this trunk line, and subscriber connections are made to the distribution lines. Trunk amplifier stations are distributed along the trunk line, and other amplifier stations may also be distributed along distribution lines, if necessary.

The main unit of an amplifier station is the amplifier itself. It is also desirable, however, to locate the tap-off points for distribution lines at amplifier stations because it is easier to tap or split the RF signals at the amplifier station without unduly disturbing the RF signals on the trunk line. Accordingly, a provision should be made for a splitter or similar device to couple RF signals from the trunk line to the distribution line or lines. Not all amplifier stations will use this feature, however, and it is desirable to provide for discretionary use of the splitter.

In some systems it is desired to transmit other signals on the cable. For example, many CATV systems originate time and weather information or programs of local interest. These signals may be originated at a location other than the head-end and it is then desirable to transmit them to the head-end or another suitable location for multiplexing onto the trunk line. Separate lines and RF transmission is expensive and difficult. Accordingly, it is desirable to utilize the cable transmission system to transmit these signals to the head-end.

It may also be desirable to provide other features, such as fault-reporting, or other subscriber services in some systems. In other systems automatic gain control is desired, however, when this feature is provided, typically only one-half or less of the amplifiers are gain controlled.

Thus, it is clear that a large variety of services and/or features are desirable in a CATV system but that not all amplifier stations will utilize the same features or provide the same services. Thus, a large number of different designs are required to accommodate all of the possible combinations of services and features. Prior art amplifier stations have not satisfactorily provided these features and services without unduly multiplying the number of amplifier station designs.

While modular CATV amplifier stations are known in the prior art, such modular stations are generally designed for easy repair or replacement of components likely to fail. Once the system is built and the amplifier stations installed, changing the function of the amplifier station or system may necessitate replacement of the amplifier stations or a substantial portion thereof.

OBJECTS AND SUMMARY OF THE INVENTION

It is a primary object of this invention to provide an amplifier station capable of accommodating a wide variety of functions.

It is another object of this invention to provide a modular amplifier station capable of accommodating a wide variety of functionally different modules.

In one aspect of this invention the above objects and advantages are provided in an amplifier station for amplifying RF signals transmitted via a cable transmission system. The amplifier station has an enclosed housing with a plurality of ports adapted to be coupled to cable segments. A base plate disposed within the housing has a plurality of RF terminals or connectors mounted thereon. A plurality of modules capable of providing suitable functions carry mating connectors for plug-in engagement or connection to selected ones of the RF terminals. The RF terminals are selectively interconnected to permit a wide variety of modules to be used. Thus, the amplifier station is characterized by great flexibility and wide variety of functions and features.

DETAILED DESCRIPTION OF THE INVENTION

For a better understanding of the present invention, together with other and further objects, advantages, and capabilities thereof, reference is made to the following disclosure and appended claims in connection with the above-described drawings.

Figure 1:
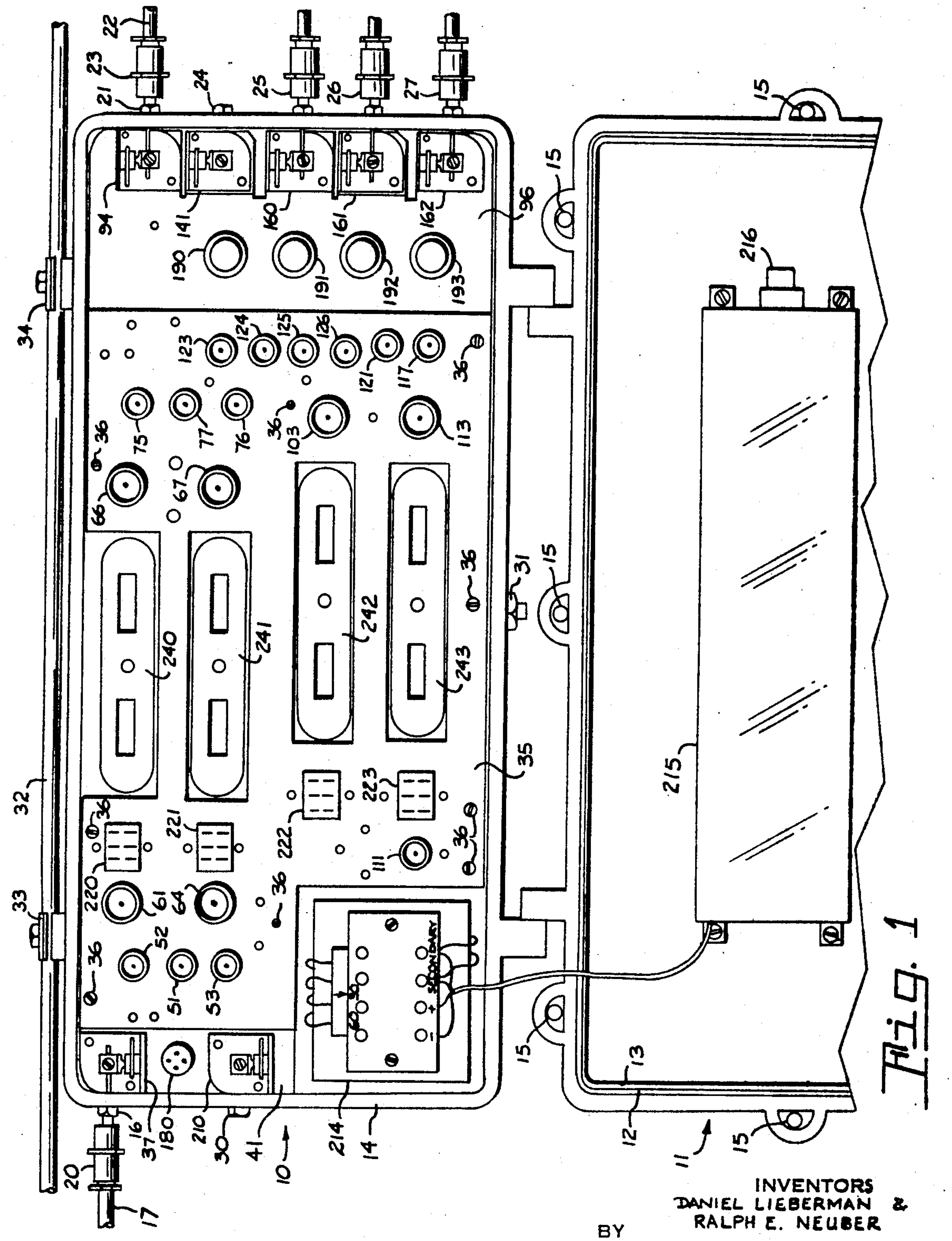
FIG. 1 is a plan view of an amplifier station in accordance with the invention.

In FIG. 1 an amplifier station is shown. The amplifier station is located in an enclosed housing which includes a base 10 and a cover 11 hinged thereto. Cover 11 has a seal such as an elastomeric gasket 12 and a flange 13 which form a tight weather and radiation seal against a flange 14 on base 10. Cover 11 is secured by a plurality of locking devices 15 which clamp to the underside of flange 14. Base 10 has a plurality of ports therein for connecting to coaxial cable segments. For example, an input port 16 is connected to an input cable 17 by a suitable connector 20, and an output port 21 is connected to an output cable 22 by a suitable connector 23. A plurality of distribution ports 24–27 are each adapted to be connected to a like plurality of distribution cables. A port 30 is adapted to receive an ac power signal which can be, for example, 30 or 60 volts and 60 Hz. An output test port 31 is also provided. The amplifier station is typically suspended from a cable 32 by suitable clamps 33 and 34 mounted on base 10. Other forms of mounting the amplifier station may also be used.

Figure 2:
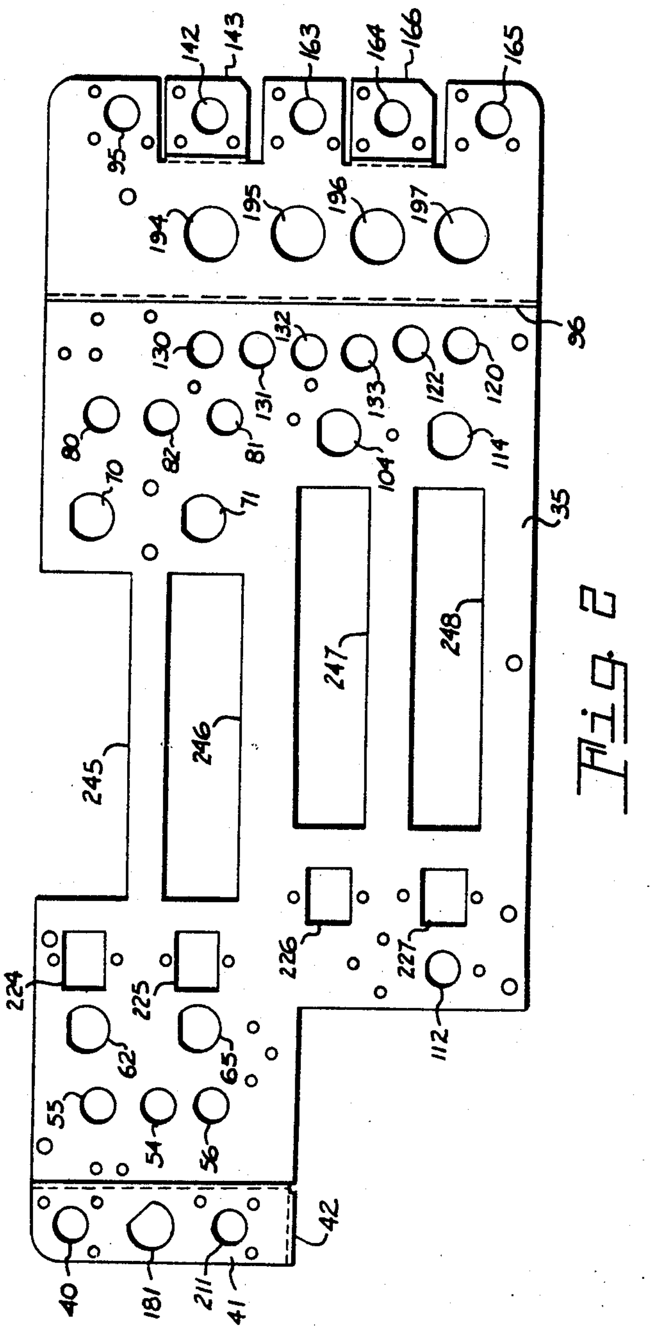
FIG. 2 is a plan view of one embodiment of a base plate for the amplifier station of FIG. 1.
Figure 3:
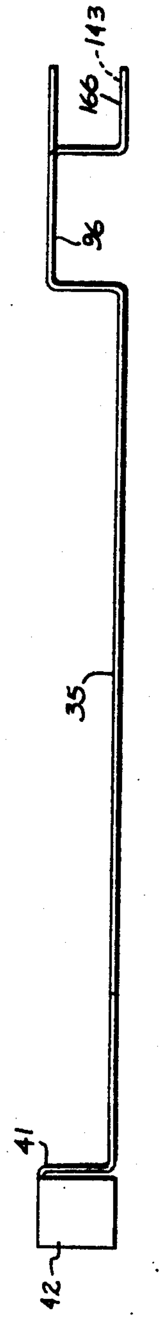
FIG. 3 is an edge view of the base plate of FIG. 2.
Figure 6A:
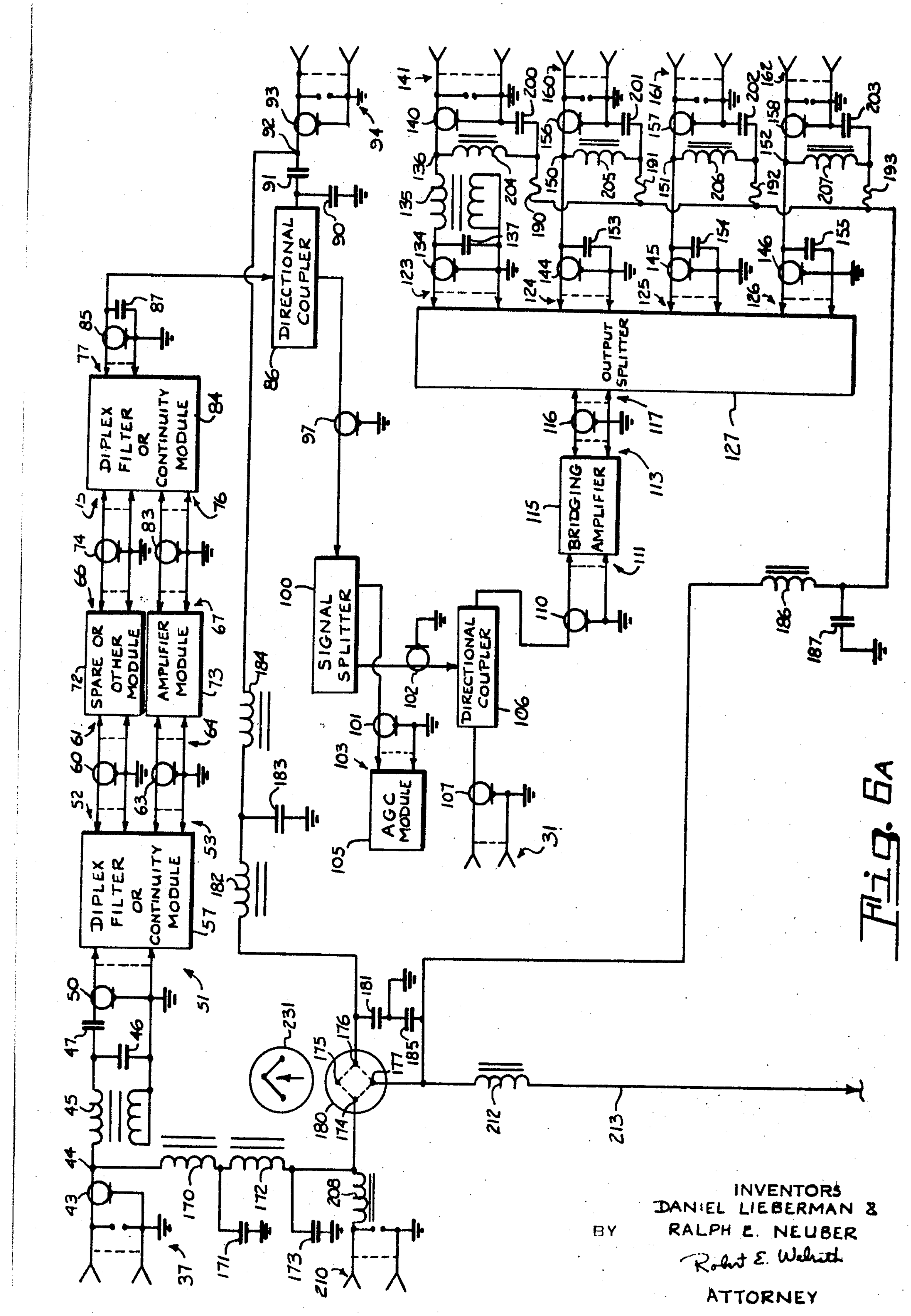
FIGS. 6A and 6B are an electrical wiring diagram of one embodiment of the invention.
Figure 6B:
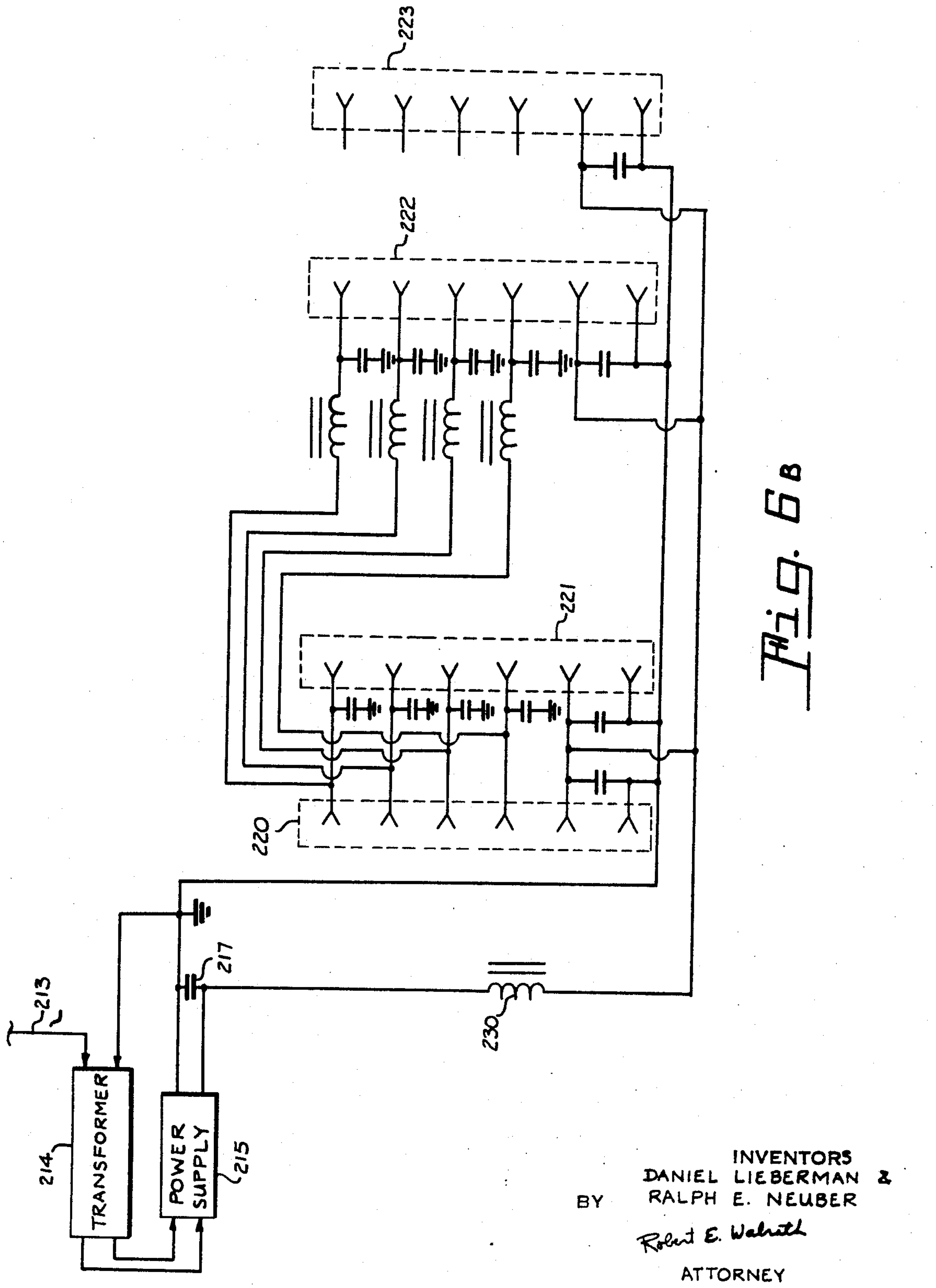

A chassis is disposed within base 10. The chassis includes a base plate 35 shown in FIGS. 2 and 3 which carries suitable terminals and connectors and the electrical components and wiring shown in FIG. 6. Base plate 35 is preferably metallic and grounded to decrease RF radiation and to provide a suitable ground plane. Base plate 35 is fixedly mounted in base 10 by suitable screws 36 which can be screwed into corresponding bosses in base 10. Discrete electrical components are carried on the underside of base plate 35, and RF terminals or connectors and other electrical connections are mounted in openings in base plate 35 for plug-in connection to suitable mating connectors carried on modules. The discrete components and wiring can be attached by riveting or otherwise attaching brackets to base plate 35. Alternatively, such components and wiring can be mounted on one or more circuit boards which are attached to base plate 35 preferably on the under side. Suitable radiation shields can also be mounted on the underside of base plate 35 to shield the various RF terminals and components.

An RF terminal or connector 37 is mounted in an opening 40 in a raised step 41 of base plate 35 so that connector 37 is adjacent port 16 for receiving the signal carrying conductor of cable 17. Step 41 has a radiation shield 42 at the open end thereof. Connector 37 and similar connectors adjacent to ports 21, 24–27, and 30 are preferably of the type disclosed in the above-referenced copending application Ser. No. 98,686, incorporating a cable clamp and a spark gap socket. Connector 37 is connected by a coaxial conductor 43 (shown in FIG. 6A) to a junction point 44. Junction 44 is connected to one end of a choke 45, the other end of which is connected by a capacitor 46 to ground. The junction between choke 45 and capacitor 46 is connected by a capacitor 47 to a coaxial conductor 50. The shield of coaxial conductors 43 and 50 are grounded, as are the shields of all other coaxial conductors. Choke 45 and capacitor 46 are an impedance matching and filter section for passing RF signals. Capacitor 47 is a high-pass filter for blocking low frequency signals such as power signals. Coaxial conductor 50 is connected to an RF terminal 51. Preferably, the RF terminals are fixedly mounted on base plate 35 for receiving corresponding module connectors. They can be male connectors surrounded by and insulated from a grounded shield. Terminal 51 is mounted on opening 54 in base plate 35. RF terminals 52 and 53 are mounted in openings 55 and 56, respectively, in base plate 35. RF terminals 51–53 are adapted to receive RF mating connectors on a signal coupling module such as a diplex filter or continuity module 57.

Terminal 52 is connected by a coaxial conductor 60 to an RF terminal 61 mounted in an opening 62 in base plate 35, while terminal 53 is connected by a coaxial conductor 63 to an RF terminal 64 mounted in an opening 65 in base plate 35. RF terminals 66 and 67 are mounted in openings 70 and 71, respectively, in base plate 35. Terminals 61 and 66 are adapted to receive corresponding RF mating connectors on a module 72 which will be described more fully below. Terminals 64 and 67 are similarly adapted to receive corresponding RF mating connectors on a module 73.

Terminals 66 and 67 are connected by coaxial conductors 74 and 83, respectively, to RF terminals 75 and 76 mounted in openings 80 and 81, respectively, in base plate 35. An RF terminal 77 is mounted in an opening 82 in base plate 35. Terminals 75–77 are adapted for receiving corresponding RF mating connectors on a signal coupling module such as a diplex filter or continuity module 84.

RF terminal 77 is connected by a coaxial conductor 85 to a directional coupler 86 or similar signal tap-off or splitting device. Capacitors 87 and 90 are connected between the input and output, respectively, of directional coupler 86 and ground for impedance matching. The output of directional coupler 86 is connected by a capacitor 91 to a junction point 92 which is further connected by a coaxial conductor 93 to an RF terminal or connector 94 mounted in an opening 95 in a raised step 96 of base plate 35 so that connector 94 is adjacent port 21 for receiving the signal carrying conductor of cable 22. Directional coupler 86 and capacitors 87, 90, and 91 operate as a high-pass filter and impedance matching network.

An output of directional coupler 86 is connected by a coaxial conductor 97 to a signal splitter 100 which provides first and second output signals via coaxial conductors 101 and 102. Coaxial conductor 101 is connected to an RF terminal 103 mounted in an opening 104 in base plate 35. Terminal 103 is adapted to receive an RF mating connector on an automatic gain control (AGC) module 105. Coaxial conductor 102 is connected to directional coupler 106 which provides first and second output signals via coaxial conductors 107 and 110. Coaxial conductor 107 is connected to a test output port such as port 31 in base 10. Coaxial conductor 110 is connected to an RF terminal 111 mounted in an opening 112 in base plate 35. An RF terminal 113 is mounted in an opening 114 in base plate 35. Terminals 111 and 113 are adapted to receive corresponding RF mating connectors on a module 115 such as a bridging amplifier.

Terminal 113 is connected by a coaxial conductor 116 to an RF terminal 117 mounted in an opening 120 in base plate 35. Another RF terminal 121 mounted in an opening 122 in base plate 35 is connected in parallel with terminal 117 as an alternate thereto. RF terminals 123–126 are mounted in openings 130–133, respectively, in base plate 35. Terminals 117, 121, and 123–126 are adapted to receive corresponding RF mating connectors on a module 127 such as an output splitter.

Terminal 123 is connected by a coaxial conductor 134 to one end of a choke 135, the other end of which is connected to a junction point 136. The junction between conductor 134 and choke 135 is connected by a capacitor 137 to ground. Junction point 136 is connected by a coaxial conductor 140 to an RF terminal or connector 141 mounted in an opening 142 in a lowered step 143 depending from step 96 of base plate 35 so that connector 141 is adjacent to port 24. Terminals 124–126 are similarly connected by coaxial conductors 144–146 to junction points 150–152, respectively. Junction points 150–152 are respectively connected to ground by capacitors 153–155 and to coaxial conductors 156–158 which are further respectively connected to RF terminals or connectors 160–162 mounted in openings 163–165, respectively, in base plate 35 so that connectors 160–162 are adjacent to ports 25–27. Openings 163 and 165 are in step 96 while opening 164 is in a lowered step 166 depending from step 96. Choke 135 is provided for RF isolation of the input to the distribution port closest to output port 21.

Since modules 72, 73, 105, and 115 contain active components, dc power must be provided to those modules. Typically, one power supply is used to couple 60 Hz. power from power lines to several amplifier stations. The power supply multiplexes the 60 Hz. power signal onto the coaxial cable which transmits it in either direction (with or against the RF signal flow) or in both directions. Thus, the ac power signal may enter the amplifier station from either the input port or the output port. Preferably each amplifier station can couple the power through the station. Since multiplexing the power onto the coaxial cable with a separate device may deleteriously affect the RF signals, port 30 is provided in base 10 so that the power supply can be coupled thereto.

Junction point 44 is connected by a choke or coil 170 in series with a capacitor 171 to ground. The junction between coil 170 and capacitor 171 is connected by a choke or coil 172 in series with a capacitor 173 to ground. The junction between coil 172 and capacitor 173 is connected to a terminal 174 on an electrical connector 180 mounted in an opening 181 in step 41 of base plate 35. Connector 180 also has terminals 175, 176 and 177. Terminal 175 is a dummy or unconnected terminal. Terminal 176 is connected by a capacitor 181 to ground and by a choke or coil 182 in series with a capacitor 183 to ground. The junction between coil 182 and capacitor 183 is connected by a choke or coil 184 to junction point 92. Terminal 177 of connector 180 is connected by a capacitor 185 to ground and by a choke or coil 186 in series with a capacitor 187 to ground. The junction between coil 186 and capacitor 187 is connected to one end of each of fuses 190–193 mounted in openings 194–197, respectively, in step 96 of base plate 35. The other ends of fuses 190–193 are connected to ground by capacitors 200–203, respectively, and by chokes or coils 204–207 to junction points 136 and 150–152, respectively. An electrical terminal or connector 210 is mounted in an opening 211 in step 41 of base plate 35 and is adapted to receive a power connection through port 30. Connector 210 is connected to terminal 174 of connector 180 by a choke or coil 208.

Terminal 177 of connector 180 is further connected by a choke or coil 212 and conductor 213 to a first input terminal of a transformer 214 (shown in FIG. 6B) which has a second input connected to ground. Transformer 214 is disposed in one corner of base 10 in a cut-out in base plate 35. The outputs of transformer 214 are connected to a power source or supply 215 mounted in cover 11. Power supply 215 can be, for example, a rectifier and filter with a dc regulator. Power supply 215 has a fuse 216 (shown in FIG. 1) and first and second outputs. The first output is connected to ground and the second output supplies a dc voltage across a capacitor 217. Transformer 214 and power supply 215 can be connected in a manner disclosed in the above-referenced copending application Ser. No. 112,863.

The first terminal of power supply 215 is connected to a first terminal on each of electrical connectors 220–223 thereby grounding the first terminal of each of connectors 220–223. Connectors 220–223 are mounted in openings 224–227, respectively, in base plate 35 and are adapted for receiving electrical mating connectors on modules 72, 73, 105, and 115, respectively. The second terminal of power supply 215 is connected by a choke or coil 230 to a second terminal on each of connectors 220–223. Each of the second terminals is connected to ground by a capacitor. Third, fourth, fifth, and sixth terminals of connector 222 are connected by corresponding chokes or coils to corresponding terminals of connectors 220 and 221. Each of these terminals is connected to ground by capacitors. The remaining four terminals of connector 223 are not used. Capacitor 217, coil 230, and the capacitors and coils connected to the various terminals of connectors 220–223 are low-pass filters to suppress noise and RF signal components.

A power program plug 231 has three terminals thereon for connecting three of the four terminals of connector 180 together. Plug 231 directs power between the input connector 37 and output connector 94 in either direction and/or from either connector 37 or 94 to the amplifier station and the distribution output connectors 141 and 160–162 depending upon the position of plug 231.

In the power distribution system, capacitor 171 and 173 and coils 170 and 172 are a low-pass filter which block RF signals present at junction point 44 from the power system. Capacitors 181 and 183 and coils 182 and 184 are a low-pass filter which block RF signals present at junction point 92. Capacitors 185, 187, and 200–203 and coils 186 and 204–207 comprise low-pass filters for the distribution outputs.

Figure 4:
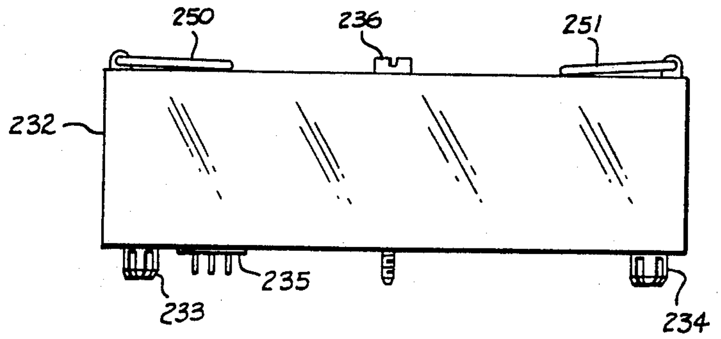
FIG. 4 is a side view of one embodiment of a module for use with the amplifier station of FIG. 1.

In FIG. 4 the general form of an active module is shown of the type adapted to be used as modules 72, 73, 105, and 115. The module includes a body 232 having two RF mating connectors 233 and 234 and an electrical mating connector 235. Each of modules 72, 73, and 115 requires both input and output RF connectors, e.g., 233 and 234, for mating with input RF terminals 61, 64, and 111 and output RF terminals 66, 67, and 113. The AGC module 105 provides only low frequency or dc outputs, and accordingly, an output RF connector and terminal is unnecessary. Thus, on the AGC module RF mating connector 233 is deleted. Since the electronic components contained in the modules include active components which generate heat, a heat sink is desirable. Suitable heat sinks 240–243 are provided in openings 245–248, respectively, of base plate 35. The modules are positioned over the heat sinks when they are in operable position. Preferably the modules are secured to the heat sinks, for example, by a screw 236 which extends through the module into a corresponding hole in the respective heat sink. Each module is also provided with a pair of pull rings 250 and 251 for easy removal of the modules.

Figure 5A:
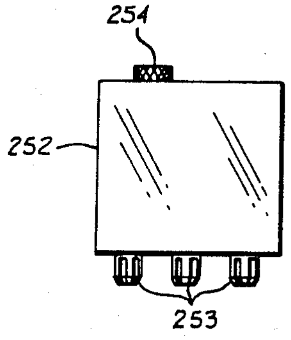
FIGS. 5A and 5B are side views of other embodiments of modules for use with the amplifier station of FIG. 1.
Figure 5B:
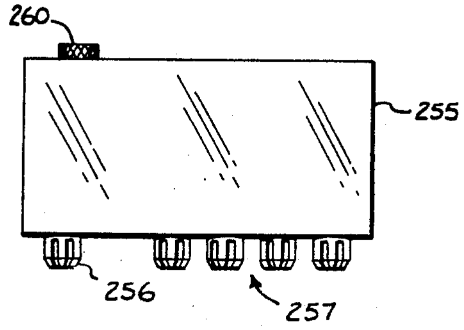

In FIGS. 5A and 5B the general form of the passive modules is shown. The passive modules are modules 57, 84, and 127. The module illustrated in FIG. 5A is the general type of module usable as modules 57 and 84, while the module illustrated in FIG. 5B is the general type of module usable as module 127. In FIG. 5A the module includes a body 252 with a plurality of RF mating connectors 253 *on one edge. A test port* 254 is provided on the accessible or top edge. In FIG. 5B the module includes a body 255 with an input RF mating connector 256 and a plurality of output RF mating connectors 257 on one edge. A test port 260 is also provided. Similar test ports can be provided in the active modules. The passive modules do not require dc power and generally do not require heat sinks. Accordingly, no heat sinks or power connections are provided for these modules.

Modules for providing various functions can be used as modules 72 and 73 with cooperating modules used as modules 57 and 84. Among the various functions are:

1. Two-way transmission of RF signals with diplexing filters used to couple signals to the amplifiers. For this function one of modules 72 and 73 contains an amplifier for amplifying RF signals, e.g., television signals, in one frequency band while the other module contains an amplifier for amplifying RF signals in a different frequency band. Modules 57 and 84 contain diplex filters for coupling the RF signals to the proper amplifier. An example of a system of this type is disclosed in the above-referenced copending application Ser. No. 29,896.

2. Two separate bands of frequencies transmitted in the same direction. Modules 72 and 73 each contain amplifiers, one for each band of frequencies. Modules 57 and 84 contain diplex filters which couple the RF signals to the proper amplifier. This type of system is also described in the copending application Ser. No. 29,896.

3. Split-band amplifiers to reduce distortion. The band of signals being transmitted is split by a diplex filter contained in module 57, amplified in separate amplifiers contained in modules 72 and 73, and recombined by a diplex filter contained in module 84. This function can be highly desirable when low second order distortion signals are desired.

4. Fault reporting of equipment failures. For this function one of modules 72 and 73, e.g., module 73, contains an amplifier and the other module contains a fault reporting circuit which can be of the type disclosed in the above-referenced copending application Ser. No. 75,429. Modules 57 and 84 contain circuits for coupling the RF signals to and from the amplifier and for coupling a monitoring signal to the fault reporting module. Such circuits can be, for example, diplex filters.

5. Redundant amplifier for increased reliability. For this function module 84 can contain a sensing circuit for detecting faulty operation of the amplifier module, e.g., module 73. Modules 57 and 84 also contain switches, e.g., reed relays, for switching the RF signals to and from module 72 when a fault occurs in module 73. For this function modules 57 and 84 would require suitable power connections which can be made, for example, to module 72.

If none of these functions are desired, one of modules 72 and 73 can be an amplifier while the other module position is left vacant. In this case modules 57 and 84 can be continuity modules which contain an RF conductor between the appropriate RF connectors thereon. Those skilled in the art will realize that numerous variations of the above functions are possible and that modules for performing additional functions can also be used.

By adding another electrical connector equivalent to connector 220, the same amplifier module can be used for module 72 to provide signal amplification for signals transmitted in either direction simply by reversing the direction of the module. With this modification separate amplifier modules are not necessary to reverse the direction of signal flow.

Directional coupler 86 taps-off part of the RF signal therethrough and couples it to signal splitter 100. One of the signals from splitter 100 is coupled to AGC module 105 which develops one or more AGC signals which are coupled via electrical connector 222 to electrical connectors 220 and/or 221 of modules 72 and 73. For example, the AGC signals can be used to control the gain of the amplifiers at more than one signal frequency, i.e., gain and slope control, thereby controlling the gain throughout a broad frequency range. Since in a typical CATV system not all of the amplifier stations need to be gain controlled, only some of the amplifier stations require an AGC module. In other systems AGC is not required and no AGC modules are used.

The other signal from splitter 100 is coupled to directional coupler 106 which couples one signal to test output port 31 and another signal to module 115. Since the amplifier station may be in an inaccessible location, a coaxial cable can be coupled to port 31 to conduct the test signal to a more accessible location. Directional couplers 86 and 106 and splitter 100 attenuate the RF signal. Accordingly, a bridging amplifier module 115 is preferably included to amplify the RF signal before it is coupled to the distribution ports 24–27.

The output signal from module 115 is coupled to RF terminal 117 which is adapted to receive an RF mating connector on the output splitter module 127 such as connector 256 of the module illustrated in FIG. 5B. The splitter module 127 has between one and four output RF mating connectors depending upon the number of output distribution lines desired. In FIG. 1 distribution cables are connected to ports 25–27 so that a three-way output splitter module is used. One-way, two-way, and four-way splitter modules can also be used. A second input RF terminal 121 is also provided so that the distribution ports used (when less than all are used) can be more easily varied by plugging the input connector of module 127 into either terminal 117 or terminal 121. Additional distribution ports can be provided on the left side of base 10, in which case it may be desired to relocate transformer 214, for example, in cover 11.

The chassis can be made so that it is more easily removable from base 10 by providing alternate mountings for connectors 37, 94, 141, 160–162, and 210 other than base plate 35.

Accordingly, an amplifier station has been provided which permits the user to utilize one basic design for a wide variety of functions. Even after a system is built, the function of the system or amplifier stations can be easily changed by replacing or adding modules without the necessity of replacing the entire amplifier station.

While there have been shown and described what are at present considered the preferred embodiments of the invention, it will be obvious to those skilled in the art that various changes and modifications may be made therein without departing from the scope of the invention as defined by the appended claims.

We claim:

1. An amplifier station for amplifying radio frequency (RF) signals transmitted via a cable transmission system comprising:

an enclosed housing having a plurality of ports each adapted to be coupled to cable segments;

a base plate and a power source disposed within said housing and fixedly attached thereto; a plurality of RF terminals mounted on said base plate;

a plurality of RF connectors each mounted in said housing adjacent corresponding ones of said ports for connection to signal carrying conductors of said cable segments connected to said ports;

means electrically connecting a first one of said RF connectors to a first one of said RF terminals, a second one of said RF terminals to a third one of said RF terminals, a fourth one of said RF terminals to a fifth one of said RF terminals, a sixth one of said RF terminals to a seventh one of said RF terminals, an eighth one of said RF terminals to a ninth one of said RF terminals, and a 10th one of said RF terminals to a second one of said RF connectors;

first and second electrical connectors mounted in corresponding openings in said base plate;

means electrically connecting said power source to said first and second electrical connectors;

a first module for amplifying RF signals in a predetermined frequency range, said first module carrying on one edge thereof two RF mating connectors and a first electrical mating connector for pluggable engagement with said third and sixth RF terminals and said first electrical connector, respectively;

a second module carrying on one edge thereof two RF mating connectors and a second electrical mating connector for pluggable engagement with said fifth and eighth RF terminals and said second electrical connector, respectively;

a first signal coupling module carrying on one edge thereof RF mating connectors for pluggable engagement with said first, second, and fourth RF terminals; and a second signal coupling module carrying on one edge thereof RF mating connectors for pluggable engagement with said seventh, ninth, and 10th RF terminals.

2. An amplifier station as defined in claim 1 wherein said housing includes first and second heat sinks positioned adjacent corresponding openings in said base plate for physically contacting said first and second modules, respectively, whereby heat generated by electronic components in said first and second modules is conducted to said first and second heat sinks, respectively.

3. An amplifier station as defined in claim 1 wherein said second module performs one of the functions of amplifying RF signals within said predetermined frequency range, amplifying RF signals in a frequency range other than said predetermined frequency range, and detecting the presence and absence of predetermined signals.

4. An amplifier station as defined in claim 1 wherein said second module is for amplifying RF signals in a frequency range other than said predetermined frequency range, and said first and second signal coupling modules each include a diplex filter.

5. An amplifier station as defined in claim 1 including means, including a directional coupler fixedly attached to said base plate, for electrically connecting said sixth RF terminal to an eleventh one of said RF terminals, said directional coupler for tapping-off a portion of the signals flowing between said sixth RF terminal and said second RF connector; a third electrical connector mounted in a corresponding opening in said base plate; means electrically connecting said power source to said third electrical connector and said third electrical connector to at least one of said first and second electrical connectors; and a third module for providing at least one gain control signal, said third module carrying on one edge thereof an RF mating connector and an electrical mating connector for pluggable engagement with said eleventh RF terminal and said third electrical connector, respectively.

6. An amplifier station as defined in claim 1 including a set of said RF terminals connected to corresponding ones of said RF connectors; a signal splitter module carrying on one edge thereof at least two RF mating connectors for pluggable engagement with an 11th one of said RF terminals and at least one of said RF terminals of said set of RF terminals; means, including a directional coupler fixedly attached to said base plate for electrically coupling said sixth RF terminal to a twelfth one of said RF terminals, said directional coupler for tapping-off a portion of the signals flowing between said sixth RF terminal and said second RF connector; means electrically connecting a thirteenth one of said RF terminals to said 11th RF terminal; a third electrical connector mounted in a corresponding opening in said base plate; means electrically connecting said power source to said third electrical connector; and a third module for amplifying RF signals, said third module carrying on one edge thereof first and second RF mating connectors for pluggable engagement with said 12th and thirteenth RF terminals, respectively, and an electrical mating connector for pluggable engagement with said third electrical connector.

7. An amplifier station as defined in claim 6 including a fourth electrical connector mounted in a corresponding opening in said base plate; means electrically connecting said power source to said fourth electrical connector and said fourth electrical connector to at least one of said first and second electrical connectors; and a fourth module for providing at least one gain control signal, said fourth module carrying on one edge thereof an RF mating connector and an electrical mating connector for pluggable engagement with a fourteenth one of said RF terminals and said fourth electrical connector, respectively, said means for electrically coupling said sixth RF terminal to a 12th one of said RF terminals including a signal splitter connected between said directional coupler and said 12th RF terminal for splitting the signal from said directional coupler and coupling a portion to each of said twelfth and fourteenth RF terminals.

8. An amplifier as defined in claim 7 wherein said housing includes first, second, third, and fourth heat sinks positioned adjacent corresponding openings in said base plate for physically contacting said first, second, third, and fourth modules, respectively, whereby heat generated by electronic components in said first, second, third, and fourth modules is conducted to said first, second, third, and fourth heat sinks, respectively.

* * * * *